US010931410B2

(12) United States Patent
Wang et al.

(10) Patent No.: US 10,931,410 B2
(45) Date of Patent: Feb. 23, 2021

(54) NETWORK-BASED REAL-TIME VIDEO TRANSMISSION METHOD AND DEVICE

(71) Applicant: CATON TECHNOLOGY (SHANGHAI) LIMITED, Shanghai (CN)

(72) Inventors: Wang Wang, Shanghai (CN); Lei Huang, Shanghai (CN)

(73) Assignee: Caton Technology (Shanghai) Limited, Shanghai (CN)

( * ) Notice: Subject to any disclaimer, the term of this patent is extended or adjusted under 35 U.S.C. 154(b) by 11 days.

(21) Appl. No.: 16/337,709

(22) PCT Filed: Dec. 16, 2016

(86) PCT No.: PCT/CN2016/110386
§ 371 (c)(1),
(2) Date: Mar. 28, 2019

(87) PCT Pub. No.: WO2018/058803
PCT Pub. Date: Apr. 5, 2018

(65) Prior Publication Data
US 2020/0044787 A1 Feb. 6, 2020

(30) Foreign Application Priority Data

Sep. 30, 2016 (CN) .......................... 201610874260.0

(51) Int. Cl.
*H04L 1/18* (2006.01)
*H04L 1/00* (2006.01)
(Continued)

(52) U.S. Cl.
CPC .......... *H04L 1/1841* (2013.01); *H04L 1/0041* (2013.01); *H04L 1/0075* (2013.01);
(Continued)

(58) Field of Classification Search
None
See application file for complete search history.

(56) References Cited

U.S. PATENT DOCUMENTS 9,334,218 B2 * 5/2016 Wang ....................... C07C 37/08
2002/0093928 A1 * 7/2002 LoGalbo ............... H04L 1/0083
370/336

(Continued)

FOREIGN PATENT DOCUMENTS

CN 101179362 A 5/2008
CN 103269260 A 8/2013
(Continued)

OTHER PUBLICATIONS

Farhan Azmat Ali, Pieter Simoens, Wim Van de Meerssche, and Bart Dhoedt, Bandwidth Efficient Adaptive Forward Error Correction Mechanism with Feedback Channel, Jun. 3, 2014, pp. 322-334 (Year: 2014).*

(Continued)

*Primary Examiner* — Christopher M Crutchfield
(74) *Attorney, Agent, or Firm* — Knobbe, Martens, Olson & Bear, LLP (57) ABSTRACT

The present invention provides a network-based real-time video transmission method, comprising: 1) caching, by a transmitting terminal, an already transmitted original data packet, and recording the transmission moment of the original data packet; 2) counting, by a receiving terminal, lost data packets and current real-time network condition information and feeding back these information to the transmitting terminal; 3) constructing, by the transmitting terminal, a retransmission data packet according to the cached lost data packet using a variable-code forward error correction technology, and transmitting the retransmission data packet to the receiving terminal, wherein the error correction rate of the retransmission data packet is determined according to (Continued)

the remaining lifetime of the lost data packet and the real-time network condition information; and, 4) receiving, by the receiving terminal, the retransmission data packet and recovering the lost data packet.

11 Claims, 2 Drawing Sheets

(51) Int. Cl.
*H04N 21/2187* (2011.01)
*H04N 21/231* (2011.01)

(52) U.S. Cl.
CPC ....... *H04L 1/1812* (2013.01); *H04N 21/2187* (2013.01); *H04N 21/23106* (2013.01)

(56) References Cited

U.S. PATENT DOCUMENTS

| | | | | |
|---|---|---|---|---|
| 2003/0089930 | A1* | 5/2003 | Zhao | H01L 29/42316 257/256 |
| 2003/0126238 | A1 | 7/2003 | Kohno et al. | |
| 2005/0114489 | A1* | 5/2005 | Yonge, III | H04L 1/0061 709/223 |
| 2007/0022361 | A1* | 1/2007 | Bauer | H04L 1/0014 714/776 |
| 2007/0121639 | A1* | 5/2007 | Degrande | H04L 1/1812 370/394 |
| 2008/0256409 | A1* | 10/2008 | Oran | H04L 1/1867 714/748 |
| 2011/0219287 | A1* | 9/2011 | Srinivas | H03M 13/07 714/781 |
| 2011/0271163 | A1* | 11/2011 | Le Floch | H04L 1/0009 714/752 |
| 2014/0118618 | A1* | 5/2014 | Ranatunga | G06F 19/3481 348/518 |
| 2015/0180786 | A1 | 6/2015 | Chen et al. | |
| 2015/0358573 | A1* | 12/2015 | Kardashov | H04N 21/26216 348/552 |
| 2016/0044527 | A1* | 2/2016 | Long | H04L 1/1858 370/235 |
| 2017/0141880 | A1* | 5/2017 | So | H04L 1/08 |

FOREIGN PATENT DOCUMENTS

| | | |
|---|---|---|
| CN | 103354615 A | 10/2013 |
| CN | 103716114 A | 4/2014 |
| CN | 104159166 A | 11/2014 |
| CN | 105871514 A | 8/2016 |
| WO | WO-2017127000 A1 * 7/2017 .......... H03M 13/353 |

OTHER PUBLICATIONS

Wuttipong Kumwilaisak, JongWon Kim and C.-C. Jay Kuo, Reliable Wireless Video Transmission via Fading Channel Estimation and Adaptation, 2000, pp. 185-190 (Year: 2000).*

Kihong Park, AFEC: An Adaptive Forward Error—Correction Protocol and Its Analysis, 1997, pp. 1-25 (Year: 1997).*

(Ming-Fong Tsai, Naveen Chilamkurti, Ce-Kuen Shieh and Alexey Vinel, MAC-level Forward Error Correction mechanism for minimum error recovery overhead and retransmission, 2010, pp. 2067-2077 (Year: 2010).*

Search Report of corresponding Chinese Patent Application No. 2016108742600—2 pages (dated Dec. 6, 2018).

International Search Report of corresponding Patent Application No. PCT/CN2016/110386—4 pages (dated Mar. 22, 2017).

Extended European Search Report of corresponding European Patent Application No. Application No. 16917548.6—6 pages (dated Mar. 26, 2020).

* cited by examiner

NETWORK-BASED REAL-TIME VIDEO TRANSMISSION METHOD AND DEVICE

CROSS-REFERENCE TO RELATED APPLICATIONS

This application is the U.S. National Phase under 35. U.S.C. § 371 of International Application PCT/CN2016/110386, filed Dec. 16, 2016, which claims priority to Chinese Patent Application No. 201610874260.0, filed Sep. 30, 2016. The disclosures of the above-described applications are hereby incorporated by reference in their entirety.

TECHNICAL FIELD

The present invention relates to the technical field of video transmission, and in particular to a network-based real-time video transmission method and device.

BACKGROUND OF THE PRESENT INVENTION

With the rapid development of Internet, network-based real-time video transmission systems have been more and more widely used in various fields such as live network broadcast of sports events, video conference systems and video communication tools, etc. It is well-known that the network video transmission has packet loss, delay and other problems. In order to overcome the above problems and improve the reliability of network-based real-time video transmission, various corresponding solutions are proposed, including forward error correction technology and automatic repeat request technology, which are respectively described below.

The Forward Error Correction (FEC) is a common method for increasing the reliability of data communication during one-way communication. In the FEC technology, a constant error correction rate (e.g., ½, ⅔, ¾, ⅚, ⅞, etc.) is set. Taking ⅞ as an example, it indicates that the original information in the transmitted data accounts for ⅞, and the other ⅛ of information is redundant error correction information. In an actual error correction encoding application, if it is assumed that 7 original data packets are taken as one group, 8 data packets will be generated after each group is subjected to forward error correction encoding. The original data packets can be decoded and recovered when a receiving terminal receives any 7 data packets in the group. In this way, the packet loss problem during network transmission is solved to a certain extent, and the reliability of the system is increased. However, this technology still has some defects. It is assumed that in a network environment in which the average packet loss rate is less than 10%, the error correction rate of forward error correction at a transmitting terminal is set as ⅞. In this case, if packet loss is evenly distributed in each group, the receiving terminal can recover all the data. However, it is well-known that, in an actual network environment, the packet losses are usually not so even, and there are often some groups whose number of lost packets exceeds a range that can be recovered by error correction, so that the whole group cannot be recovered. On the other hand, if the redundant load of the forward error correction is increased, for example, if the error correction rate of the forward error correct is set to ¾, the fluctuation in network quality can be tolerated to a larger extent, but this will increase the bandwidth and reduce the effective utilization of the bandwidth. In addition, the forward error correction technology will add additional calculation overhead, which will have a negative impact on the throughput of the system.

The Automatic Repeat reQuest (ARQ) technology is a method for handling an error caused during transmission by monitoring lost or wrong data packets by a receiving terminal and requesting the transmitting terminal to retransmit the lost or wrong data packets. Common ARQ methods include stop-and-wait ARQ, go-back-n ARQ and selective repeat ARQ. In the stop-and-wait ARQ, after a data message has been sent, a sender waits for a status report from a receiver. If the status report message is sent successfully, subsequent data messages will be sent; or otherwise, this message will be retransmitted. This method requires the least buffer storage space, but has the disadvantage of low channel efficiency. In the go-back-n ARQ, the transmitting side consecutively sends a plurality of frames without waiting for the response from the receiving side. If an error is found in the transmitted frame, the frame with the error and all frames thereafter will be retransmitted. This method is low in complexity, but unnecessary frames will be retransmitted, so the efficiency is not high when it is used in a large range. In the selective repeat ARQ, the transmitting side consecutively transmits a plurality of frames without waiting for the response from the receiving side. If an error is found in the transmitted frame, the transmitting side will only retransmit the frame with the error. This method is more complicated than the former two, but also the most efficient.

The ARQ technology can reduce the redundant network load and has higher bandwidth utilization, but it will bring technical problems such as increased delay. The following description will be given by taking the selective repeat ARQ with the highest efficiency as an example. If the packet loss rate of the network is 20%, the Round-Trip Time (RTT) of the network is 500 milliseconds (which is a typical cross-border network situation between China and overseas). Thus, in the most ideal case, the success rate of data packets after three retransmissions is 99.84%. In other words, for the data packets on the transmitting side, a relatively ideal reception rate can be reached only after three retransmissions. The process of the three retransmissions includes: transmitting original packets by the transmitting terminal, feeding back an ARQ request by the receiving terminal, performing the first retransmission by the transmitting terminal, feeding back an ARQ request by the receiving terminal again, performing the second retransmission by the transmitting terminal, feeding back an ARQ request by the receiving terminal again, and performing the third retransmission by the transmitting terminal. Thus, the generated delay is at least 3.5 times the RTT. It can be known that one obvious disadvantage of this technology lies in the increased delay if real-time video data is to be transmitted reliably. If the quality of the network environment is poor (e.g., high inherent packet loss rate, large inherent delay and large network jitter), the above defects will become more apparent.

Therefore, there is an urgent need for a real-time video transmission solution capable of reducing the redundant network load and the transmission delay.

SUMMARY OF THE PRESENT INVENTION

The task of the present invention is to provide a real-time video transmission solution capable of reducing the redundant network load and the transmission delay.

According to one aspect of the present invention, a network-based real-time video transmission method is provided, including the following steps:

1) caching, by a transmitting terminal, an already transmitted original data packet, and recording the transmission moment of the original data packet;

2) counting, by a receiving terminal, lost data packets and current real-time network condition information, and feeding back these information to the transmitting terminal;

3) constructing, by the transmitting terminal, a retransmission data packet according to the cached lost data packet using a variable-code forward error correction technology, and transmitting the retransmission data packet to the receiving terminal, wherein the error correction rate of the retransmission data packet is determined according to the remaining lifetime of the lost data packet and the real-time network condition information; and 4) receiving, by the receiving terminal, the retransmission data packet and recovering the lost data packet.

In the step 3), the less the remaining lifetime of the lost data packet is and the worse the real-time network condition is, the higher the error correction rate used to construct the retransmission data packet is in case of not exceeding the maximum available network bandwidth; and, the more the remaining lifetime of the lost data packet is and the better the real-time network condition is, the lower the error correction rate used to construct the retransmission data packet is.

The real-time network condition information includes a real-time packet loss rate.

In the step 2), the real-time network condition information further includes discrete packet loss distribution information; and the step 3) further incudes: when the discrete packet loss distribution information shows that the current network burst consecutive packet loss ratio exceeds a preset threshold, correspondingly increasing the group length of retransmission codes during construction of the retransmission packet.

In the step 3), the group length G of transmission codes satisfies the following condition: G>N/L, where N represents the number of lost packets corresponding to a peak of a distribution curve of the number of consecutive lost packets and L represents the real-time packet loss rate.

In the step 3), the variable-code forward error correction technology is a Raptor code technology or an improved LT code technology.

The step 2) further includes counting the current network bandwidth by the receiving terminal.

The step 3) further includes: while transmitting the retransmission data packet, transmitting, by the transmitting terminal, error correction rate information set for this retransmission; and the step 4) further includes: parsing, by the receiving terminal, the retransmission data packet according to the received error correction rate information, and recovering the lost data packet.

In the step 3), the remaining lifetime is obtained by subtracting, from the maximum buffer time, the elapsed time from the transmission moment of the original data packet corresponding to the lost data packet.

According to another aspect of the present invention, a network-based real-time video transmission device is provided, including:

a transmitting terminal device, configured to cache an already transmitted original data packet and record the transmission moment of the original data packet, and reconstruct, according to the cached lost data packet using a variable-code forward error correction technology, a retransmission data packet and transmit the retransmission data packet to a receiving terminal device, wherein the error correction rate of the retransmission data packet is determined according to the remaining lifetime of the lost data packet and a real-time network condition; and a receiving terminal device, configured to count lost data packets and the current network condition and feed back these information to the transmitting terminal device, and receive the retransmission data packet and recover the lost data packet.

The transmitting terminal device includes:

a transmitting terminal buffer module, configured to cache an already transmitted original data packet and record the transmission moment of the original data packet;

a data packet transmission queue processing module, configured to envelop a data packet to be transmitted and perform smooth rectification output at a certain interval according to a transmission code rate;

a feedback packet receiving and processing module, configured to receive and parse a feedback packet transmitted back from the receiving terminal and transfer packet loss information in the feedback packet to a lost packet retransmission module; and the lost packet retransmission module, configured to obtain real-time network condition information according to the parsed result of the feedback packet receiving and processing module, generate a retransmission packet for a lost packet by a forward error correction encoding algorithm, and output the retransmission packet to the data packet transmission queue processing module, wherein the error correction rate of the retransmission data packet is determined according to the remaining lifetime of the lost data packet and the real-time network condition information.

The receiving terminal device includes:

a data packet receiving and parsing module, configured to receive a data packet and parse a header of the data packet, count the current real-time network condition information and output the information to a feedback packet generation module;

a retransmission packet decoding module, configured to perform forward error correction decoding on the retransmission packet;

a feedback packet generation module, configured to feed back the real-time network condition information to the transmitting terminal; and a reception buffer module, configured to reorder the received original packet and the successfully decoded retransmission packet.

Compared with the prior art, the present invention has the following technical effects.

1. The present invention can reduce the redundant network load of the real-time video transmission.

2. The present invention can reduce the transmission delay of the real-time video transmission.

3. The present invention is particularly suitable for realizing real-time video transmission in a network environment having a high packet loss rate and high delay.

BRIEF DESCRIPTION OF THE DRAWINGS

The embodiments of the present invention will be described below in detail with reference to the accompanying drawings, in which.

DETAILED DESCRIPTION OF THE PRESENT INVENTION

The present invention will be further described below by embodiments with reference to the accompanying drawings.

Figure 1:
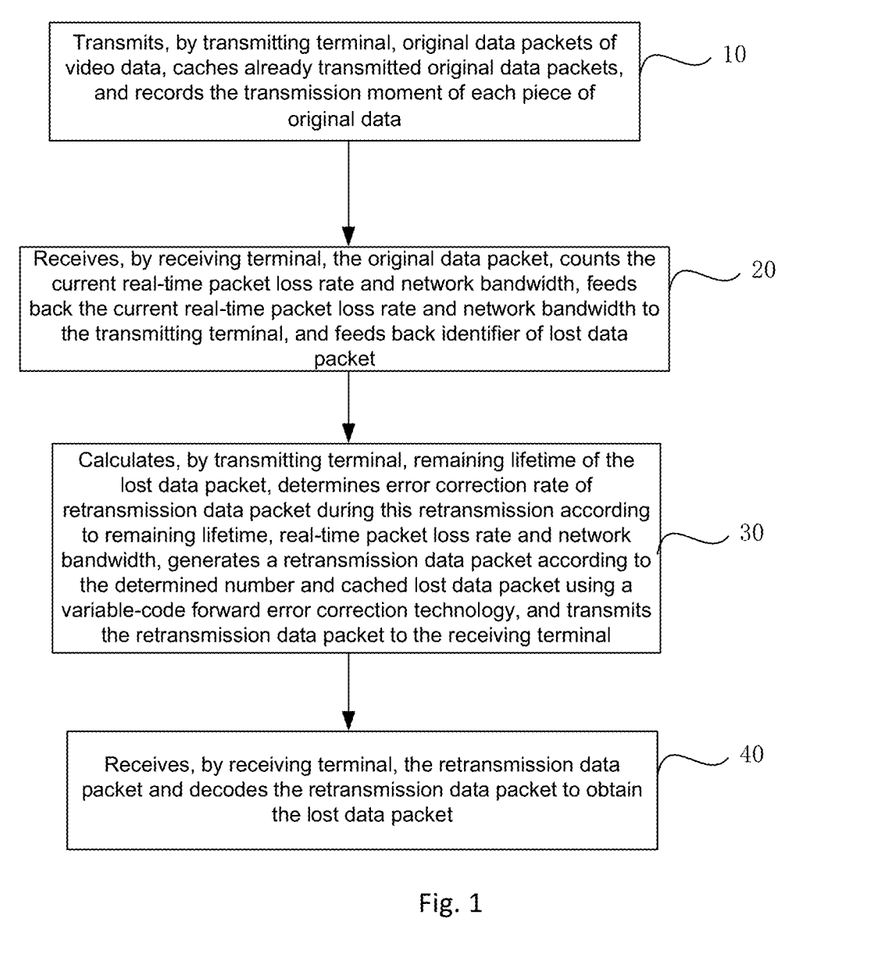
FIG. 1 shows a timing flowchart of a real-time video transmission method according to an embodiment of the present invention.

FIG. 1 shows a timing flowchart of a real-time video transmission method according to an embodiment of the present invention. With reference to FIG. 1, the transmission method includes the following steps.

Step 10: A transmitting terminal transmits original data packets of video data, caches already transmitted original data packets, and records the transmission moment of each piece of original data. This transmission moment will be used in the subsequent steps.

Step 20: A receiving terminal receives the original data packets and determines whether there is a lost data packet; and if yes, the current real-time packet loss rate and network bandwidth are counted and fed back to the receiving terminal, and an identifier of the lost data packet, for example, a sequence number of the data packet is also fed back. In a network environment having a high packet loss rate and high delay, a plurality of data packets will often be lost within a short time. Therefore, in this embodiment, identifiers of a plurality of lost data packets can be fed back each time. For ease of description, the plurality of lost data packets fed back each time are referred to as a group of lost data packets. In a specific implementation, if the sequence numbers of data packets received by the receiving terminal within a period of time are not consecutive, the data packets corresponding to the lost sequence numbers can be considered as lost data packets.

Step 30: The transmitting terminal calculates the remaining lifetime of the lost data packet, determines an error correction rate of a retransmission data packet during this retransmission according to the remaining lifetime, the real-time packet loss rate and the network bandwidth, generates a retransmission data packet according to the determined number and the cached lost data packet using a variable-code forward error correction technology (e.g., LT code or Raptor code technology), and transmits the retransmission data packet to the receiving terminal. The variable-code forward error correction code is sometimes referred to as rateless code.

In this embodiment, in order to improve the success rate of the retransmission, the variable-code forward error correction technology is used to generate a retransmission packet. The variable-code forward error correction is a video transmission technology with a variable error correction rate. When the network quality is poor and the real-time packet loss rate is high, the failure rate of retransmission of the lost data packet is also high. Therefore, more redundancy should be added during the retransmission of the lost data packet to improve the error correction rate. In this way, even if the receiving terminal receives only a part of retransmission data packets, all lost data packets can be recovered based on the received part of retransmission data packets. For example, assuming that the packet loss rate of the network is 20% and the RTT is 500 ms, if n packets are lost within a certain period of time, then slightly more than 1.25*n retransmission packets are generated by a raptor code (that is, the error correction rate is slightly higher than 4/5), and the success rate of retransmission can theoretically approach to 100%. In a real network environment, the packet loss rate usually changes, and by intelligently adjusting the retransmission strategy, reliable transmission can be realized at the minimum bandwidth cost and transmission delay can be reduced.

In addition, the error correction rate of the retransmission data packet is also related to the remaining lifetime of the to-be-retransmitted data packet cached by the transmitting terminal. The to-be-retransmitted data packets are the lost data packets reported by the receiving terminal. Since the transmitted date packets are cached in the step 10, the corresponding to-be-retransmitted data packets can be found from a cache region according to the sequence numbers of the lost data packets fed back by the receiving terminal. It is well-known that the delay that can be tolerated during the real-time video data transmission is limited, that is, the time for the transmission and recovery of the data packets needs to be within a delay threshold. Therefore, for a data packet having an earlier original transmission time (i.e., the recorded transmission moment of the original data packet in the step 10), it is more necessary to improve the success rate of retransmission in order to prevent the delay from exceeding a preset threshold due to a retransmission failure. Correspondingly, for a data packet having a later original transmission moment, even if this retransmission is failed, there may be another retransmission opportunity, so the requirement for the success rate of this retransmission can be reduced relatively. In this embodiment, the concept of remaining lifetime is used to characterize the urgency of retransmission of the lost data packet. Specifically, the remaining lifetime is obtained by subtracting, from the maximum buffer time (i.e., the delay threshold), the elapsed time from the transmission moment of the original data packet. In a specific implementation, the transmission time can be represented by the moment when the original data packet enters a buffer region. For a data packet to be retransmitted, if the remaining time is more, the corresponding error correction rate is lower, that is, the redundancy during the generation of the retransmission data packet is lower; and, if the remaining lifetime is less, the corresponding error correction rate is higher, that is, the redundancy during the generation of the retransmission data packet is higher. Finally, the construction of the retransmission packet is also related to the network bandwidth. For example, during the construction of the retransmission data packet, the transmission rate of the retransmission data packet should not exceed the limit of the current network bandwidth.

In conclusion, in this embodiment, the less the remaining lifetime of the lost data packet is and the higher the real-time packet loss rate is, the higher the error correction rate used to construct the retransmission data packet is in case of not exceeding the maximum available network bandwidth. In this way, more redundant information is generated for such retransmission packets, so that the success rate of reception during this retransmission is improved and the delay accumulation resulted from multiple retransmission failures is reduced. The more the remaining lifetime of the lost data packet is and the lower the real-time packet loss rate is, the lower the error correction rate used to construct the retransmission data packet is. In this way, the requirement for the delay threshold can be satisfied, and the retransmission process can be prevented from occupying too much bandwidth.

It is to be noted that, in the step 30, the real-time packet loss rate reflects the real-time network condition. The worse the real-time network condition is, the higher the error correction rate used to construct the retransmission data packet is. In other embodiments, the real-time network condition can be represented by other parameters, for example, network delay jitter, discrete packet loss distribution and the like (all the parameters can be acquired by feedback information from the receiving terminal). When the real-time network condition represented by other parameters is worse, the retransmission data packet is constructed at a higher error correction rate. For example, when the discrete packet loss distribution information indicates that the current network Burst packet loss (i.e., burst consecutive packet loss) ratio is high, the group length of data packets is correspondingly increased during the construction of the retransmission packets, so that the probability of decoding failure of the receiving terminal due to the consecutive loss of retransmission packet groups is reduced. Assuming that the real-time packet loss rate is L, the discrete packet loss distribution information indicates that the current network Burst packet loss rate is relatively large, and most packets are consecutively lost by about N (that is, the peak of the distribution curve of the number of consecutive lost packets is about N). If the group length of retransmission codes is assumed as G, without adding the data redundancy, it can be deduced from $G*(1-L)=R$ and $G-N>R$ (where R is the number of data packets, in this group, received by the receiving terminal) that, by ensuring $G>N/L$, this group can be successfully recovered by the receiving terminal.

Step 40: The receiving terminal receives the retransmission data packet and decodes the lost data packet.

Further, in an embodiment of the present invention, in the step 30, the lost data packets during transmission are grouped according to the remaining lifetime (the remaining lifetime is represented by TTL hereinafter), wherein TTL=the maximum buffer time T−(the current system time−the system time when the data packet enters the buffer region). For the grouping rule, $T_{int}$ is used as a time unit (the value of $T_{int}$ is usually RTT/2 or RRT). It is assumed that the maximum group length is $L_{max}$, that is, data packets satisfying $TTL \in [T_{int}*i, T_{int}*(i+1)]$ are classified into one group (where $$0 <= i < \left\lceil \frac{T}{T_{int}} \right\rceil,$$

and ⌈ ⌉ represents rounding up). When the group length L is greater than $L_{max}$, this group is subdivided into $\lceil L/L_{max} \rceil$ groups. If it is assumed that the maximum number of consecutive lost packets is $B_{max}$, the average arithmetic value of consecutive lost packets is $B_{avg}$, and the current average packet loss rate is $l_t$, the value of $L_{max}$ is $(B_{max}+B_{avg})/2*l_t$. Data packets in the group may be updated. When the TTL of a data packet satisfies the following condition: $TTL<=0$, this data packet will be removed from this group. When new feedback depicts that the data packet has been received successfully, this data packet is removed from this group. When new feedback depicts that a data packet is lost and the conditions of the existing group are satisfied, this data packet is added into the existing group.

In an embodiment of the present invention, an improved LT code is used as a code for the forward error correction encoding algorithm (the improvement is manifested as follows: after the degree of certainty, the data packet is selected from different set interval at different probabilities, rather than being selected completely randomly, so that the problem of non-uniform information distribution is avoided).

Furthermore, in an embodiment of the present invention, the retransmission packet is generated in the following two situations:

1. when a new data packet is added in the existing group each time, some retransmission packets are generated in an incremental manner; and 2. when no new data packet is added in the group (that is, in the case of a group having a smaller TTL), if the consecutive count (CC) carried by the latest feedback packet is greater than the consecutive count (CC) of the last transmitted retransmission packet in the group, it is indicated that all retransmission packets have been received, the successfully corrected and decoded packets have been removed from this group, so that it is only necessary to generate retransmission packets for the remaining data packets.

In the first situation, the process of generating retransmission data packets is as follows (the number of existing data packets in the group is assumed as m, M represents the set of existing data packets, the number of newly added data packets is n, N represents the set of newly added data packets, and the current average packet loss rate is $l_t$).

1. The number $$R_n = \left[ \left( \frac{m}{1-l_t} - \left\lfloor \frac{m}{1-l_t} \right\rfloor \right) + \frac{n}{1-l_t} \right] * (1+\sigma)$$

of data packets during this retransmission is calculated, where [ ] represents rounding down, σ is a redundancy parameter, $$\sigma = \frac{l_t - l_t^z}{1-l_t} + C, z = \frac{T-TTL}{T_{int}},$$

C is a compensation factor and satisfies the condition that $$C < \frac{bw}{vr} - \frac{1}{1-l_t},$$

bw is the total available bandwidth, and vr is the average code rate of data transmission (e.g., an average video code rate).

2. The random generation degree d satisfies the following condition: $1<=d<=m+n$, where the distribution of d satisfies a robust soliton distribution (for robust soliton distribution, please refer to the following document: Luby, M.LT Codes. *The 43rd Annual IEEE Symposium on Foundations of Computer Science*. 2002.).

3. d data packets are selected from M∪N, and the d selected data packets are subjected to XOR operation to obtain retransmission packets. If it is assumed that S is the set of selected data packets and the length is d, the retransmission packet is $P_i = \Sigma_{i=0}^{d-1} \oplus S_i$, where $\oplus$ represents the XOR operation. The distribution probability $P_i$ of the d data packets in each subset is obtained by the following formulae:

$$P_i = \begin{cases} 1, & (0 \le i < n, S_i = N_i) \\ P_n, & (0 \le i < n, S_i \in N, S_i \ne N_i) \\ P_n, & (d > n, n \le i < d, S_i \in N) \\ P_m, & (S_i \in M) \end{cases} \quad \text{(formula 1)}$$

-continued $$P_m = \begin{cases} \dfrac{1}{\ln\left(1 + \dfrac{m}{n}\right)}, & m > 15n \\ \dfrac{1}{e}, & m \le 15n \end{cases} \quad \text{(formula 2)}$$

$$P_n = 1 - P_m. \quad \text{(formula 3)}$$

4. The steps 2 and 3 are repeated until $R_n$ retransmission packets are generated.

The process of generating retransmission packets in the second situation is similar to that of the first situation. If it is assumed the set of data packets in the group is N and the length is n, the process is as follows (this process may also be replaced with a Raptor code, RaptorQ code or the like).

1. The number $$R_n = \left\lceil \dfrac{n}{1-l_t} \right\rceil * (1 + \sigma)$$

of data packets during this retransmission is calculated, where σ is a redundancy parameter, $$\sigma = \dfrac{l_t - l_t^z}{1 - l_t} + C, \; z = \dfrac{T - TTL}{T_{int}},$$

C is a compensation factor and satisfies the condition that $$C < \dfrac{bw}{vr} - \dfrac{1}{1 - l_t},$$

bw is the total available bandwidth, and vr is the average code rate of data transmission (e.g., an average video code rate).

2. The random generation degree d satisfies the following condition: 1<=d<=m+n, where the distribution of d satisfies a robust soliton distribution. For robust soliton distribution, please refer to the following document: Luby, M.LT Codes. *The 43rd Annual IEEE Symposium on Foundations of Computer Science*. 2002.).

3. d data packets are selected from N, and the d selected data packets are subjected to XOR operation to obtain retransmission packets. If it is assumed that S is the set of selected data packets and the length is d, the retransmission packet is $P_i = \Sigma_{i=0}^{d-1} \oplus S_i$.

4. The steps 2 and 3 are repeated until $R_n$ retransmission packets are generated.

Figure 2:
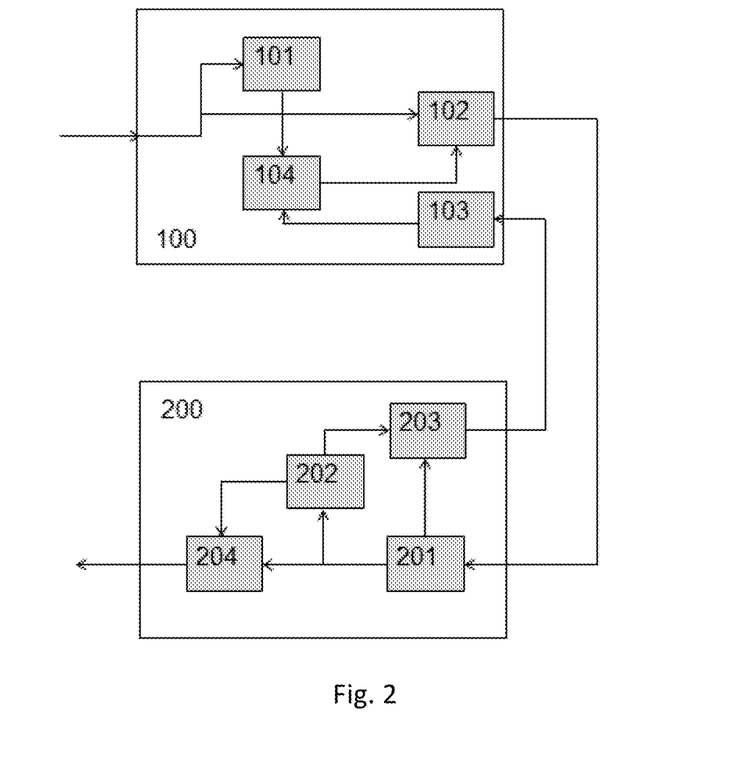
FIG. 2 shows a schematic block diagram of a network-based real-time video transmission device according to an embodiment of the present invention.

Further, FIG. 2 shows a schematic block diagram of a network-based real-time video transmission device according to an embodiment of the present invention. With reference to FIG. 2, the network-based real-time video transmission device includes a transmitting terminal device 100 and a receiving terminal device 200. The transmitting terminal device 100 includes a transmitting terminal buffer module 101, a data packet transmission queue processing module 102, a feedback packet receiving and processing module 103 and a lost packet retransmission module. These modules will be described separately.

The transmitting terminal buffer module 101 is configured to store data packets already transmitted. A user can set the size of the buffer region using the buffer time. The set buffer time represents the maximum time for all data packets to stay in the buffer region. Here, assuming that the buffer time set by the user is T ms. When a data packet enters the buffer region, a sequence number is generated for this data packet. The sequence number is accumulated according to the entering order.

The data packet transmission queue processing module 102 is configured to envelop a data packet to be transmitted and perform smooth rectification output at a certain interval according to a transmission code rate, so as to avoid additional packet loss due to the non-uniformity of the original input code rate. The module regularly counts the number of the received external input data packets and retransmission data packets. The external input data packets and the retransmission data packets jointly form the data packets to be transmitted. The data packet transmission queue processing module 102 is further configured to calculate the average interval of data packets output by the transmitting terminal and rectify the data packets to be transmitted, so that data packets can be smoothly output in a constant rhythm when the data amount of two data streams corresponding to the external input data packets and the retransmission data packets fluctuate instantly. For example, if it is assumed that the total number of external input data packets and retransmission data packets input to the data packet transmission queue processing module 102 per second is N, the average interval of data packets transmitted to the receiving terminal is 1000/N ms. A data packet is enveloped before being transmitted, and additional header information is added. The header contains the sequence number of the data packet and a 16-bit consecutive count CC. The count will be incremented by 1 when each data packet is output. When the cycle overflows, the count will be set to 0 and then the accumulation will start again.

The feedback packet receiving and processing module 103 is configured to receive and parse a feedback packet transmitted back from the receiving terminal, and transfer the feedback packet to the lost packet retransmission processing module 104 for packet loss retransmission if the feedback packet contains packet loss information.

The lost packet retransmission processing module 104 obtains real-time status information (e.g., including the packet loss rate, RTT, data packet reception time jitter, distribution condition of consecutive packet loss and the like) of the current network in accordance with the parsed result of the feedback receiving and processing module 103, generates retransmission packets for lost data packets by a forward error correction encoding algorithm, and outputs the retransmission packets to the data packet transmission queue processing module 102 so as to enter a transmission queue. In accordance with the parsed result of the feedback receiving and processing module 103, the lost data packets during transmission are grouped according to the remaining lifetime (the remaining lifetime is represented by TTL hereinafter), wherein TTL=the maximum buffer time T−(the current system time−the system time when the data packet enters the buffer region). For the grouping rule, $T_{int}$ is used as a time unit (the value of $T_{int}$ is usually RTT/2 or RRT). It is assumed that the maximum group length is $L_{max}$, that is, data packets satisfying TTL∈[$T_{int}$*i, $T_{int}$*(i+1)] are classified into one group (where $$0 <= i < \left\lceil \dfrac{T}{T_{int}} \right\rceil,$$

and ⌈ ⌉ represents rounding up). When the group length L is greater than $L_{max}$, this group is subdivided into $\lceil L/L_{max} \rceil$ groups. If it is assumed that the maximum number of consecutive lost packets is $B_{max}$, the current average packet loss rate is $l_t$, and the value of $L_{max}$ is $B_{max}/l_t$. Data packets in the group may be updated. When the TTL of a data packet satisfies the following condition: TTL<=0, this data packet will be removed from this group. When new feedback depicts that the data packet has been received successfully, this data packet is removed from this group. When new feedback depicts that a data packet is lost and the conditions of the existing group are satisfied, this data packet is added into the existing group.

In an embodiment of the present invention, an improved LT code is used as a code for the forward error correction encoding algorithm (the improvement is manifested as follows: after the degree of certainty, the data packet is selected from different set interval at different probabilities, rather than being selected completely randomly, so that the problem of non-uniform information distribution is avoided).

The receiving terminal device 200 includes a data packet receiving and parsing module 201, a retransmission packet decoding module 202, a feedback packet generation module 203 and a reception buffer module 204.

The data packet receiving and parsing module 201 is configured to receive a data packet and parse a header of the data packet, count the transmission condition of the current network and packet loss information, and output the information to the feedback packet generation module 203 for allowing the feedback packet generation module 203 to generate a feedback packet. If the parsed data packet is an original packet, the data packet is output to the reception buffer module 204; and if the parsed data packet is a retransmission packet, the data packet is output to the retransmission packet decoding module 202.

Figure 3:
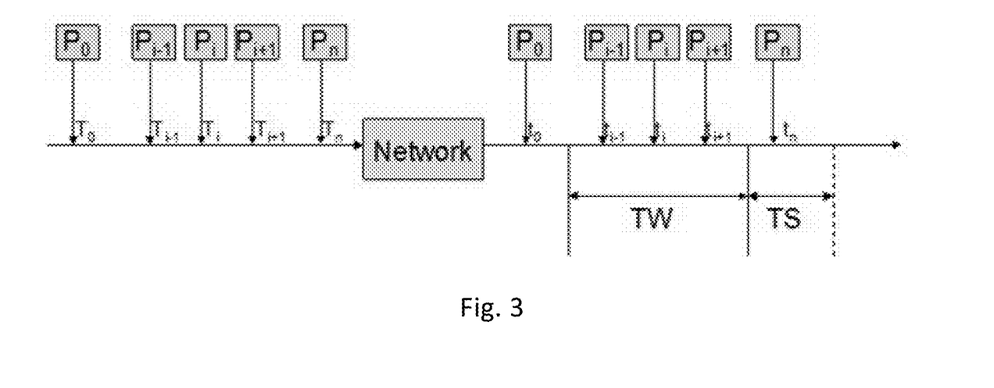
FIG. 3 shows a schematic diagram of a transmission process of data packets on a time axis.

Further, FIG. 3 shows a schematic diagram of the transmission process of data packets on a time axis, where $T_i$ represents the transmission time of a data packet $P_i$ that is transmitted in multiple paths, and the time value is the local time of the transmission moment of the packet recorded by the transmitting terminal and transmitted by a Timestamp field of the header; $t_i$ represents the reception time of $P_i$, and the time value is the local time of the reception moment of the packet recorded by the receiving terminal; and, TW represents a sliding time window (the time unit is ms). In this embodiment, the value of the sliding time window TW is a half or ¼ of the maximum reception buffer time. TS is the update interval of data statistics of the sliding time window, and the value of the TS is generally TW/2. The statistical granularity of the network packet loss rate is the sliding time window. The data packet receiving and parsing module 201 counts the transmission condition of the current network and the packet loss information on the basis of the sliding time window.

The retransmission packet decoding module 202 is configured to perform FEC decoding on the retransmission packet, and the successfully decoded packet is output to the reception buffer module 204. The sequence number of the successfully decoded packet is output to the feedback packet generation module 203 to generate feedback information. For specific decoding process, please refer to the following document: Luby, M.LT Codes. *The 43rd Annual IEEE Symposium on Foundations of Computer Science.* 2002.

The feedback packet generation module 203 is configured to feed back the network status information and the packet loss information to the transmitting terminal. In an embodiment of the present invention, the feedback information at least contains the sequence number of the first data packet reordered in the reception buffer module 204, the current maximum consecutive count CC, the list of sequence numbers of original data packets lost in the network, the current average packet loss rate, the maximum consecutive packet loss length, and the list of sequence numbers of original data packets successfully decoded by the retransmission packet decoding module 202.

The reception buffer module 204 is configured to reorder the received original packets and the successfully decoded retransmission packets, and output the reordered data packets to an external module.

Finally, it is to be noted that the foregoing embodiments are merely for describing the technical solutions of the present invention rather than limiting the technical method. The present invention can be extended to other modifications, variations, applications and embodiments in application, and all the modifications, variations, applications and embodiments shall be considered as falling into the spirit and teaching scope of the present invention.

What is claimed is:

1. A network-based real-time video transmission method, comprising:
   1) caching, by a transmitting terminal, an already transmitted original data packet, and recording the transmission moment of the original data packet;
   2) counting, by a receiving terminal, lost data packets and current real-time network condition information, and feeding back these information to the transmitting terminal;
   3) constructing, by the transmitting terminal, a retransmission data packet according to the cached lost data packet using a variable-code forward error correction technology, and transmitting the retransmission data packet to the receiving terminal, wherein the error correction rate of the retransmission data packet is determined according to the remaining lifetime of the lost data packet and the real-time network condition information; and
   4) receiving, by the receiving terminal, the retransmission data packet and recovering the lost data packet,
   wherein the step 3) further comprises: while transmitting the retransmission data packet, transmitting, by the transmitting terminal, error correction rate information set for this retransmission; and
   the step 4) further comprises: parsing, by the receiving terminal, the retransmission data packet according to the received error correction rate information.

2. The network-based real-time video transmission method according to claim 1, wherein in the step 3), the less the remaining lifetime of the lost data packet is and the worse the real-time network condition is, the higher the error correction rate used to construct the retransmission data packet will be in case of not exceeding the maximum available network bandwidth; and, the more the remaining lifetime of the lost data packet is and the better the real-time network condition is, the lower the error correction rate used to construct the retransmission data packet will be.

3. The network-based real-time video transmission method according to claim 2, wherein the real-time network condition information comprises a real-time packet loss rate.

4. The network-based real-time video transmission method according to claim 3, wherein in the step 2), the real-time network condition information further comprises discrete packet loss distribution information; and
   the step 3) further comprises: when the discrete packet loss distribution information shows that the current network burst consecutive packet loss ratio exceeds a preset threshold, correspondingly increasing the group length of retransmission codes during construction of the retransmission packet.

5. The network-based real-time video transmission method according to claim 4, wherein in the step 3), the group length G of transmission codes satisfies the following condition: G>N/L, where N represents the number of lost packets corresponding to a peak of a distribution curve of the number of consecutive lost packets and L represents the real-time packet loss rate.

6. The network-based real-time video transmission method according to claim 2, wherein in the step 3), the variable-code forward error correction technology is a Raptor encoding technology or an improved LT encoding technology.

7. The network-based real-time video transmission method according to claim 1, wherein the step 2) further comprises counting the current network bandwidth by the receiving terminal, and feeding back the counted current network bandwidth to the transmitting terminal together with lost data packets and current real-time network condition information.

8. The network-based real-time video transmission method according to claim 2, wherein in the step 3), the remaining lifetime is obtained by subtracting, from the maximum buffer time, the elapsed time from the transmission moment of the original data packet corresponding to the lost data packet.

9. A network-based real-time video transmission device, comprising:
   a transmitting terminal device, configured to cache an already transmitted original data packet and record the transmission moment of the original data packet, and reconstruct, according to the cached lost data packet using a variable-code forward error correction technology, a retransmission data packet and transmit the retransmission data packet to a receiving terminal device together with error correction rate information set for this retransmission;, wherein the error correction rate of the retransmission data packet is determined according to the remaining lifetime of the lost data packet and a real-time network condition; and
   a receiving terminal device, configured to count lost data packets and the current network condition and feed back these information to the transmitting terminal device, and to receive the retransmission data packet, parse the retransmission data packet according to the received error correction rate information, and recover the lost data packet.

10. The network-based real-time video transmission device according to claim 9, wherein the transmitting terminal device is further configured to:
    cache an already transmitted original data packet and record the transmission moment of the original data packet;
    envelop a data packet to be transmitted and perform smooth rectification output at a certain interval according to a transmission code rate;
    receive and parse a feedback packet transmitted back from the receiving terminal; and
    obtain real-time network condition information according to the parsed result, generate a retransmission data packet for a lost data packet by a forward error correction encoding algorithm,
    wherein the error correction rate of the retransmission data packet is determined according to the remaining lifetime of the lost data packet and the real-time network condition information.

11. The network-based real-time video transmission device according to claim 9, wherein the receiving terminal device is further configured to:
    receive a data packet and parse a header of the data packet, count the current real-time network condition information;
    perform forward error correction decoding on the retransmission packet;
    feed back the real-time network condition information to the transmitting terminal; and
    reorder the received original packet and the successfully decoded retransmission packet.

* * * * *